Dec. 27, 1960 R. A. HARTMAN 2,966,206
ORGANIZATION AND CLIP USEFUL FOR INSTALLING FURNITURE WEBBING
Filed April 25, 1958
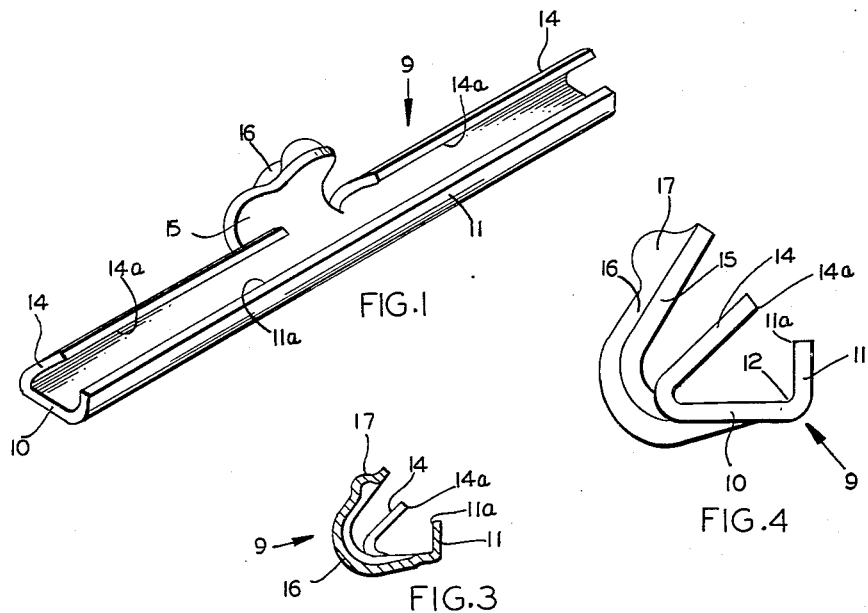
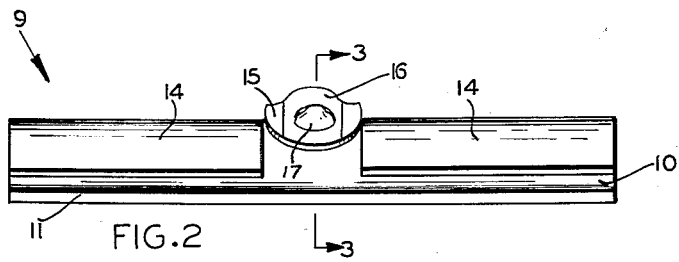
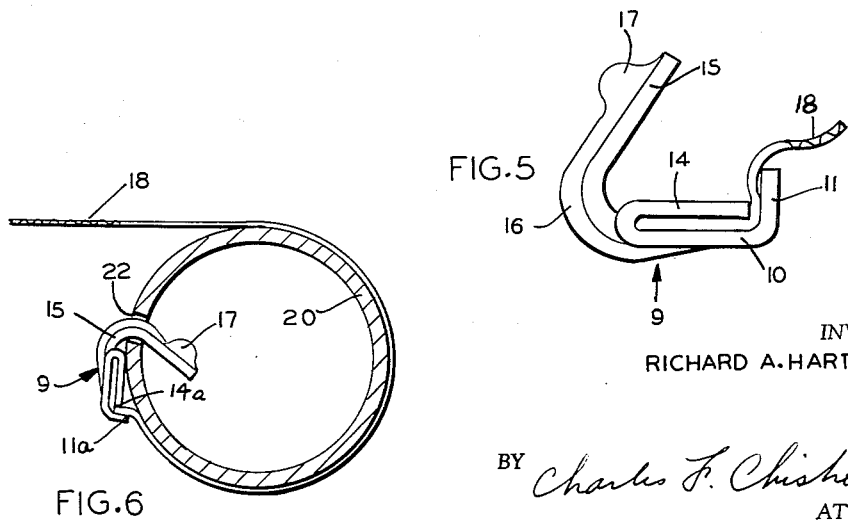
INVENTOR
RICHARD A. HARTMAN
BY Charles F. Chisholm
ATTORNEY United States Patent Office 2,966,206
Patented Dec. 27, 1960

2,966,206

ORGANIZATION AND CLIP USEFUL FOR INSTALLING FURNITURE WEBBING

Richard A. Hartman, Madison, N.J., assignor, by mesne assignments, to United-Carr Fastener Corporation, Boston, Mass., a corporation of Delaware Filed Apr. 25, 1958, Ser. No. 731,062

6 Claims. (Cl. 155—178)

This invention relates to a furniture webbing-strip organization and clip therefor, being applicable also to other strips and clips.

The best mode in which I have contemplated carrying out my invention is herein disclosed and is shown in the drawings, the drawings being scale drawings of the particular embodiment of the invention that is disclosed. A specimen of my clip is hereto attached and made a part hereof. In respect of the clip, this exemplifies the best mode in which I have contemplated carrying out my invention except that I contemplate eliminating the two round holes that are in the specimen. These two holes are nonfunctional as far as the clip itself is concerned.

Fig. 1 of the drawings is an isometric view of the clip, before being affixed to a strip of webbing or the like. The view is on an enlarged scale, the particular clip having a length of 2⅜" and being made of sheet aluminum .040" thick.

Fig. 2 is a plan view of the clip shown in Fig. 1, to the same scale.

Fig. 3 is a section on line 3—3 of Fig. 2, to the same scale.

Fig. 4 is a view of the clip looking from the left of Fig. 2, on a still larger scale.

Fig. 5 is an end view, corresponding with Fig. 4 and to the same scale, showing the clip affixed to a strip such as a strip of webbing.

Fig. 6 is a large-scale cross section through a tubular member having a strip attached thereto by the clip of Figs. 1–5.

The clip 9 shown in the drawing is made in one piece from sheet metal. Taken as a whole, the clip is adapted to extend transversely of the strip to which it is affixed and to span the entire width of the strip.

The clip 9 includes a leg 10 and a leg 11 which are at right angles to each other. These two legs are connected by a short radius at the internal right-angular corner 12 (Fig. 4). Another leg 14 is connected by a moderate radius with leg 10 and, before the clip is used, extends at an angle of about 45 degrees to leg 10. As seen in Figs. 1 and 2, the leg 14 is in two sections, metal being taken from the center of this leg to form hook 15.

As is perhaps best seen in Fig. 4, the legs 10 and 14 are the two legs of a V-shaped formation. The leg 11 extends perpendicularly from the free end of leg 10. Both faces of each of the legs 10, 11 and 14 are planar surfaces. The hook 15 has an embossed strengthening rib 16 and an embossed wart 17.

To affix the clip 9 to a strip, such as a strip of furniture webbing 18, the end of the strip is inserted into the internal angular formation formed by legs 10 and 14. Then both sections of leg 14 are bent downwardly, bringing the inner flat face of that leg firmly against the webbing and into juxtaposition with the inner flat face of leg 10; see Fig. 5. As shown in Fig. 5, the clip now has a U-shaped portion providing first and second parallel legs, 14 and 10, that are connected together at one end. The strip 18 extends between legs 14 and 10, with the tip of the strip adjacent to the bend of the U formation; and the legs 14 and 10 make face-to-face clamping engagement with the strip 18 throughout the length thereof that lies between the legs 14 and 10.

Leg 14 constitutes wedging means which wedges the strip 18 against the inner flat face of leg 11. The clip is so proportioned that as leg 14 is bent down to the condition shown in Fig. 5, the tip of leg 14 moves into closely-confronting relationship with leg 11 and wedges the webbing 18 against leg 11. The clip has sufficient yieldability in leg 11 and at the juncture of legs 14 and 10 to accommodate a measure of variation in the thickness of the webbing 18.

An advantageous manner in which the webbing strip 18 may be attached to a tubular member by the clip 9 is shown in Fig. 6. In this figure, tubular member 20 is of sheet metal and may be a frame member in furniture. After hook 15 has been engaged with a suitable opening 22 in the wall of the member 20, the webbing strip 18 is extended around the member 20 and pulled taut as shown in Fig. 6. The other end of webbing strip 18 will ordinarily be provided with a duplicate clip 9 and be secured to a tubular member in like manner. The wart 17 assists in maintaining the hook in engagement with the tubular member 20 before the webbing strip 18 has been pulled taut, or in the event that the webbing strip relaxes in use.

The free end of two-section leg 14 provides a two-section edge at 14a (Fig. 4). Leg 11 provides an edge 11a. Two-section edge 14a is in parallel relation with edge 11a, and both of these edges are parallel to the axis of the tubular member 20. The clip 9 holds the strip 18, between the end of the strip and edge 14a, in a plane parallel to a plane tangent to the outer surface of the tubular member 20. Also, between edges 14a and 11a, the clip holds the strip in a plane perpendicular to a plane tangent to the outer surface of the tubular member, Thus, the end portion of the strip 18 is so held by the clip 9 that the strip has two bights, one in contact with edge 14a and the other in contact with edge 11a.

The bight which is in contact with edge 14a is in spaced relation to the outer surface of tubular member 20, and the bight which is in contact with edge 11a is contiguous to the outer surface of the tubular member. The clip presses this second bight against the surface of the tubular member. This two-bight arrangement of the strip 18 in clip 9 affords a high degree of holding power between the clip and the strip.

The present clip is economical as regards the amount of material and is of good appearance when used in a chair. The clip may be formed, and be affixed to the end of the strip, by any suitable procedure and instrumentalities known to the art of forming sheet metal.

The clip may be made of suitable metal, such as aluminum, brass, or soft steel. In shearing the metal for forming the clip, I shear the end of the leg 14 from top to bottom as it appears in Fig. 5, and I shear the end of the leg 11 from right to left as it appears in Fig. 5.

I claim:

1. In an organization of tubular support and flexible strip, the strip being attached to the tubular support by a sheet-metal clip which extends transversely of the strip and is affixed to an end portion thereof, and the clip having a hook that is engaged in an opening in the wall of the tubular support; the improvement which comprises: the clip having a U-shaped portion providing first and second parallel legs connected together at one end, the strip extending between the two parallel legs with the tip of the strip adjacent to the bend of the U formation and the two parallel legs making face-to-face clamping engagement with the strip throughout the length thereof that lies between the parallel legs, and the clip having a third leg which is disposed perpendicularly to the two parallel legs and which extends across and beyond the tip of the first parallel leg, one end of the third leg being integrally connected to the free end of the second parallel leg and the other end of the third leg being free, the strip extending between the tip of the first parallel leg and the confronting face of the third leg, and the top of the first parallel leg wedging the strip against the confronting face of the third leg.

2. The improvement as in claim 1 in which the tip of the first parallel leg is located in spaced relation to the outer surface of the tubular support, and the free end of the third leg is located contiguous to the outer surface of the tubular support.

3. The improvement as in claim 2 in which the strip extends at least partially around the tubular support, and the free end of the third leg presses the strip against the outer surface of the tubular support.

4. The improvement as in claim 1 in which the clip holds the parallel-leg-clamped portion of the strip in a plane that is parallel to a plane that is tangent to the outer surface of the tubular support at approximately the opening in the tubular support.

5. The improvement as in claim 4 in which the clip holds the strip, between the free end of the parallel legs and the free end of the third leg, in a plane perpendicular to a plane that is tangent to the outer surface of the tubular support at approximately the opening in the tubular support.

6. A sheet-metal clip for positioning transversely across a sheetlike strip and clenching to an end portion thereof, said clip consisting solely of a hook and first, second and third planar legs connected together by small radii, the first and second legs being at an acute angle to each other, the second and third legs being perpendicular to each other, the third leg being adapted to move across the tip of the first leg when the clip is clenched, and the first leg being a two-part leg with the hook located between the two parts thereof.

References Cited in the file of this patent

UNITED STATES PATENTS

| | | |
|---|---|---|
| 2,444,873 | Goldberg | July 6, 1948 |
| 2,784,727 | Fleischer | Mar. 12, 1957 |
| 2,845,671 | Fisher et al. | Aug. 5, 1958 |
| 2,856,990 | Thomas | Oct. 21, 1958 |

UNITED STATES PATENT OFFICE
CERTIFICATION OF CORRECTION

Patent No. 2,966,206                          December 27, 1960

Richard A. Hartman

It is hereby certified that error appears in the above numbered patent requiring correction and that the said Letters Patent should read as corrected below.

Column 2, line 37, for "member," read -- member. --; column 3, line 7, for "top" read -- tip --.

Signed and sealed this 16th day of May 1961.

(SEAL)
Attest:

ERNEST W. SWIDER
Attesting Officer

DAVID L. LADD
Commissioner of Patents